Dec. 9, 1924. 1,518,608
C. SHORT
TOOTH SHADE GUIDE
Filed July 27, 1920
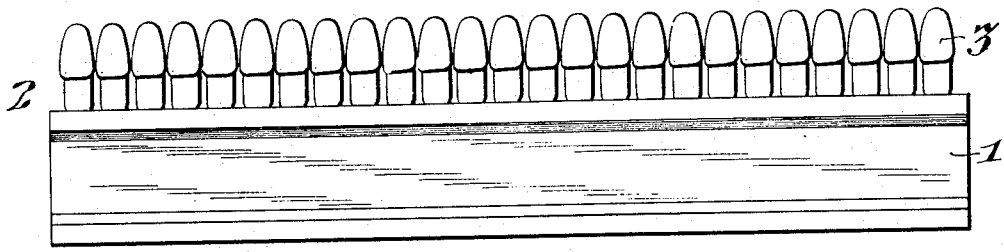
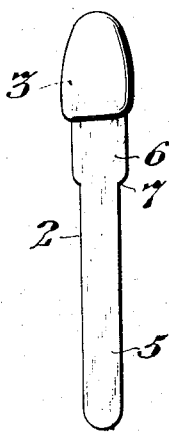
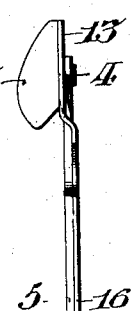
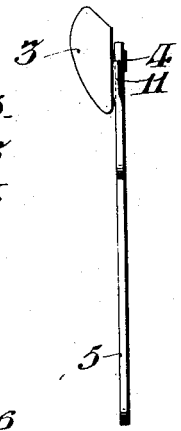
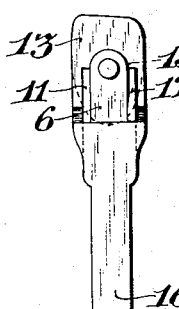
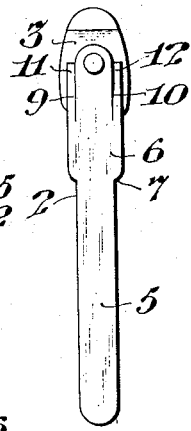
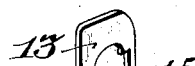
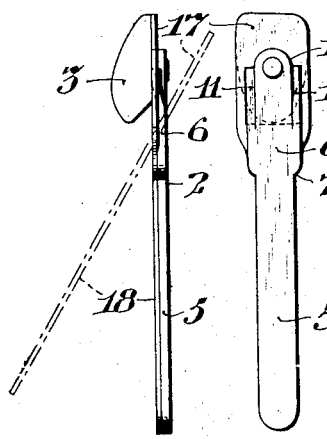
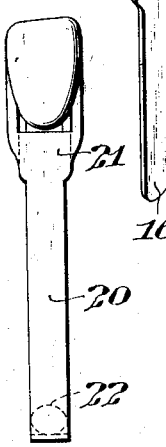
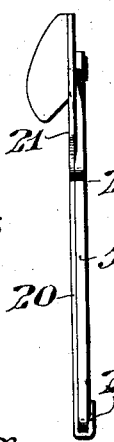
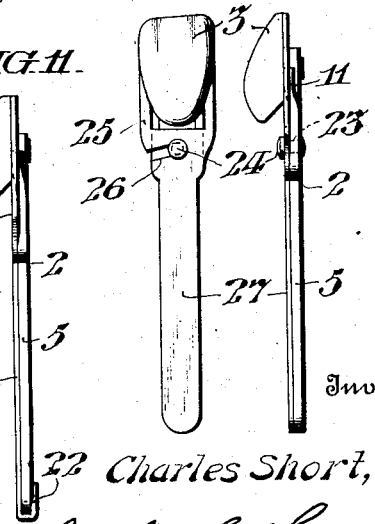
Witness
Elsie J. Lukens
Inventor
Charles Short,
By
Clifton C. H. Callwell,
Attorney Patented Dec. 9, 1924.

1,518,608

UNITED STATES PATENT OFFICE.

CHARLES SHORT, OF DARBY, PENNSYLVANIA, ASSIGNOR TO THE S. S. WHITE DENTAL MANUFACTURING COMPANY, A CORPORATION OF PENNSYLVANIA.

TOOTH SHADE GUIDE.

Application filed July 27, 1920. Serial No. 399,288.

*To all whom it may concern:*

Be it known that I, CHARLES SHORT, a citizen of the United States, and a resident of Darby, county of Delaware, State of Pennsylvania, have invented certain new and useful Improvements in Tooth Shade Guides, of which the following is a specification, reference being had to the accompanying drawings.

My invention relates particularly to that class of devices that are employed by dentists in determining by comparison the particular shade of artificial stock teeth that may be best substituted for the natural teeth of the patient, and is especially directed to means employed in connection with tooth mountings or tags upon which the individual teeth are pivotally supported, for backing said teeth.

Tooth facings which are usually mounted upon a backing of gold are affected in their color or shade, especially along their incisal margin, which is relatively thin, by such gold backings, and, therefore, the shade of a tooth as shown by the shade-guide will not be the true shade of the same tooth when mounted upon its backing.

The principal object of my invention is to provide an attachment or device which may be employed in connection with tooth mountings or tags of a tooth shade-guide, to afford such a temporary or trial backing for the teeth thereon as to produce in said tooth a color or shade similar to the color or shade produced by the gold mounting or backing to which a stock tooth is to be attached.

Other objects of my invention are to provide such an attachment or device, so constructed and arranged as to be readily associated with or applied to and removed from the tooth mountings or tags of a tooth shade-guide in position to effect the desired result.

My invention comprehends a device for the purpose contemplated having means by which it may be removably secured to the tooth mountings or tags of a tooth shade-guide.

Specifically stated, the form of my invention as hereinafter described, comprises a tooth backing or trial plate preferably formed of metal resembling gold, and having an aperture therein to receive the tooth end portion of the tooth mounting or tag of a tooth shade-guide, and having a shank forming a handle by which it may be held; said backing plate being arranged to closely overlie the back face of the shade-guide tooth, and the handle being arranged to overlie the shank of the tooth mounting or tag, and be held therewith, while comparing said shade-guide tooth with the natural teeth of the patient.

My invention also includes all of the various novel features of construction and arrangement as hereinafter more definitely specified.

In the accompanying drawings, Figure 1 is a front elevation view of the tooth shade-guide comprising the holder and a plurality of tooth mountings removably carried thereby; Fig. 2 is an enlarged front elevational view of a tooth mounting or tag removed from the holder showing the tooth mounted therein in its normal position; Fig. 3 is a side elevational view of the structure shown in Fig. 2; Fig. 4 is a rear elevational view of the structure shown in Figs. 2 and 3; Fig. 5 is a side elevational view similar to Fig. 3 but showing the tooth with its incisal end upturned, and a backing plate showing a convenient embodiment of my invention associated therewith; Fig. 6 is a rear elevational view of the tooth mounting and the associated backing plate shown in Fig. 5; Fig. 7 is a perspective view of the backing plate per se; Fig. 8 is a side elevational view of a tooth mounting showing a modified form of a backing plate embodying my invention, applied thereto; Fig. 9 is a rear elevational view of the tooth mounting and backing plate shown in Fig. 8; Fig. 10 is a front elevational view of a tooth mounting having a backing plate applied thereto embodying another modified form of my invention; Fig. 11 is a side elevational view of the tooth mounting and backing plate shown in Fig. 10; Fig. 12 is a front elevational view of a tooth mounting having applied thereto a plate embodying a further modification of my invention; and Fig. 13 is a side elevational view of the tooth mounting and plate shown in Fig. 12.

In said figures, the holder 1 which is preferably formed of sheet material, is provided with suitably spaced elongated apertures arranged to receive the tooth mountings or tags 2, to each of which a tooth 3 is pivoted by means of the pintle 4, which is preferably secured in the tooth, and which is rotatably mounted in one end of the mounting or tag 2.

The tooth mounting or tag 2 is provided with an elongated shank 5 of uniform width, arranged to be conveniently received in the apertures provided therefor in the holder 1, and is relatively narrower than the body 6 adjacent to the tooth, to afford shoulders 7 to form abutments arranged to engage the upper wall of the holder 1 when inserted therein, as shown in Fig. 1.

The body 6 of the tooth mounting or tag 2 is provided with slits 9 and 10 extending longitudinally therein and forming spring tines 11 and 12, which are bent forwardly, as best shown in Fig. 3 in frictional engagement with the rear surface of the tooth 3.

In the form of my invention shown in Figs. 5 and 6, the tooth backing plate 13, which is preferably formed of sheet metal resembling gold, is provided with the aperture 15 arranged to receive the tooth end portion of the body 6 of the tooth mounting or tag 2, and is provided with a shank forming a handle 16 by which it may be held and which is offset, as best shown in Fig. 5, so as to closely overlie the back surface of the shank 5 of the tooth mounting or tag 2, while the backing portion of the plate 13 closely overlies the back face of the tooth carried by said mounting. In this form of my invention, it will be seen that the backing plate may be associated with the tooth and its mounting or tag by merely placing it against the same, being conveniently associated with and withdrawn from said mounting and tooth by a lineal movement.

In the form of my invention shown in Figs. 8 and 9, the backing plate 17 and its handle forming shank 18 are disposed in a common plane, and said plate is provided with the aperture 19 arranged to receive the tooth end of the tooth mounting or tag 2. In this form of my invention, the shank of the tooth mounting or tag 2 must be thrust through the aperture 19, while the backing plate 17 is held at an angle to the plane of said tooth mounting or tag, as indicated in dot and dash line in Fig. 8; it being obvious that when the shank 16 has been thrust through said opening, the plate and its handle may be brought into parallelism with the back face of the tooth 3 and the front face of the shank 5 of the tooth mounting or tag 2, as shown in said figure.

In the form of my invention shown in Figs. 10 and 11, the shank forming the handle 20 of the backing plate 21 is arranged to closely overlie the front face of the shank 5 of the tooth mounting or tag 2, and is extended around the lower end thereof to provide a hook 22, projecting upwardly against the back surface of said shank 5 to maintain the plate 21 and its handle forming shank 20 in locked relation with said tooth mounting or tag 2. In this form of my invention, the backing plate may be engaged with the tooth mounting or tag 2 in the same manner as indicated in Fig. 8, until in proper longitudinal position, when the lower end of the handle forming shank 20 may be thrust laterally to engage the lower end of the shank 5 of the tooth mounting or tag 2 in the slot formed by the upturned hook portion 22, when it may be brought back until the edges of the shank 5 and the handle 20 register as shown in Fig. 10.

In the form of my invention shown in Figs. 12 and 13, the tooth mounting or tag is provided with the stud 23, having the head 24, and the backing plate 25 is provided with the slot 26 extending inwardly from one edge thereof of a width substantially equal to the diameter of the stud 23, and so arranged that when the plate 25 is brought into proper longitudinal position with respect to the tooth mounting or tag 2, it may be rocked laterally to engage the slot with the shank 23 and then rocked back into the position indicated in Fig. 12, wherein the lateral edges of the handle 27 of the backing and the shank 5 of the tooth mounting or tag 2 register. In this position, it will be obvious that the head 24 of the stud 23 maintains the backing and the tooth mounting or tag 2 in locked relation.

My invention is advantageous in that it provides a trial backing for the shade tooth of a tooth shade-guide, which resembles gold, and which produces in said shade-tooth the appearance in color or shade, of a tooth facing when attached to a gold mounting.

I do not desire to limit my invention to the precise details of construction and arrangement as herein set forth, as it is obvious that various modifications may be made therein without departing from the essential features of my invention as defined in the appended claims.

Having thus described my invention, I claim:—

1. A device of the class described, comprising a shade tooth permanently mounted on a holder, and a trial backing for said shade tooth arranged to be readily applied and removed from said tooth.

2. A device of the class described, comprising a shade tooth permanently mounted on a holder, and a trial backing for said shade tooth readily applied and removed from said tooth, and having an opening arranged to receive a holder therein.

3. A device of the class described, comprising a shade tooth permanently mounted on a holder, and a trial backing for said shade tooth, and arranged to embrace said holder and having a handle overlying said holder, and arranged to be held together by the thumb and finger of the operator.

4. A device of the class described, comprising a shade tooth permanently mounted on a holder, and a trial backing loosely applied to said shade tooth, and arranged to embrace said holder, and having an offset handle adapted to be held engaged with said holder by the operator to operatively apply said backing to said tooth.

5. A device of the class described, comprising a shade tooth permanently mounted on a holder, and a trial backing for said shade tooth arranged to be readily applied and removed from said tooth, and having an opening through which said holder may extend, said backing being provided with means for removably securing it to said holder.

6. A device of the class described, comprising a trial backing for a shade tooth of a tooth shade-guide shaped to be fitted to the shade tooth and to engage the tooth mounting or tag while in assembled relation, and having means for removably securing it thereto.

In witness whereof, I have hereunto placed my hand this 26th day of July, A. D. 1920.

CHARLES SHORT.

Witnesses:
FRANK G. HAWKSWORTH,
CLIFTON C. HALLOWELL.